3,556,890
PROCESS FOR PRODUCTION OF INTERLAYER
SAFETY-GLASS
Francis T. Buckley, Hampden, Raymond F. Riek, Wilbraham, and Donald I. Christensen, East Longmeadow, Mass., assignors to Monsanto Company, St. Louis, Mo., a corporation of Delaware
No Drawing. Filed Nov. 16, 1967, Ser. No. 683,487
Int. Cl. B32b 31/12
U.S. Cl. 156—106                                    13 Claims

ABSTRACT OF THE DISCLOSURE

This invention relates to a process for improving the impact strength of polyvinyl butyral interlayer glass laminate which comprises depositing on at least one surface of at least one of the members to be laminated and additive which increases the impact strength of the resulting laminate wherein the increased impact strength additive is deposited at at least one glass/poly(vinyl butyral) interface in the resultant laminate.

BACKGROUND OF THE INVENTION

(1) Field of the invention

The present invention is related to the field of safety laminates for use in vehicular, architectural and other related applications. More particularly, it is related to laminated safety glass having a plastic interlayer interposed between sheets of glass wherein at least one surface of either the glass or the interlayer is treated with an impact strength increasing additive prior to the lamination step, such that in the resulting laminate the additive is deposited in the interface between the glass and the interlayer.

(2) Description of the prior art

Laminated safety-glass comprises two or more glass sheets bound with an interlayer of a transparent, adherent plastic. The usual glass sheet is plate glass or tempered glass of varying thicknesses. The usual plastic interlayer is a plasticized polyvinyl acetal resin formed in a sheet or film with a thickness of about 0.015 inch or more. The major commercial use of these safety-glass compositions is in architectural applications and for automobile windshields, as well as for windshields in other moving vehicles. The ever-increasing number of automobiles and the faster speed of travel today, coupled with the greater area of modern day windshields, has accentuated the need for improved laminated safety-glass. These structures must not only help protect persons in a car from being struck by flying objects from the outside but should prevent occupants from penetrating the windshield on impact after a sudden stop. The danger of being cut by glass in the windshield can occur not only when a body strikes the windshield and penetrates it but also when the windshield is broken and glass fragments are released. The glass laminates must be constructed so as to minimize the danger of flying glass after impact. In addition, the glass laminate should be capable of absorbing energy on impact at low deceleration levels, thereby decreasing the possibility of skull fracture which may occur when a head strikes the windshield, while also supplying added resistance to penetration.

Improved impact resistance in laminated safety-glass has been obtained by incorporating various additives into the interlayer as described in such U.S. Pats. as 3,262,835; 3,262,836; 3,249,488 and 3,249,489. Thus, the prior art methods call for incorporating the impact strength increasing additives into the resin or the interlayer.

Once the additives have been incorporated into the resin or the sheet they cannot be removed without further processing. Conversely, if the sheet has been formed without incorporating the additives used in increase impact strength in the resulting laminate it was generally believed that the sheet would have to be reprocessed in order to incorporate such additives into the sheet. Furthermore, the use of additives which are incorporated in the interlayer to control impact strength may necessitate two or more separate production facilities to produce interlayer material for applications which cannot tolerate the presence of these additives.

The present invention solves the foregoing problems by providing glass laminates with improved impact strength wherein the additives used to improve the impact strength of the laminates may be introduced on the surface of at least one member to be laminated after the formation of the interlayer sheet and prior to the actual lamination step.

The additives used to increase the impact strength of the laminates, which are hereinafter described in detail, will be referred to as increased impact strength additives for the purposes of the present application.

SUMMARY OF THE INVENTION

The present invention is directed toward a method for improving the impact strength of laminated safety-glass comprising a polyvinyl butyral interlayer interposed between glass sheets which method comprises treating at least one surface of at least one member of the laminate with an increased impact strength additive prior to lamination wherein the increased impact strength additive is deposited at at least one glass/poly(vinyl butyral) interface of the resulting laminate.

The principal object of this invention is to provide laminated safety-glass having improved safety features and improved physical properties.

A further object of this invention is to provide a laminated safety-glass having improved resistance to penetration by impacting objects such as the human head.

A further object is to provide novel members for laminates in order to accomplish the above objects.

Another object of this invention is to provide a novel process for treating the members of the laminates in order to accomplish the preceding objects.

DESCRIPTION OF THE PREFERRED EMBODIMENTS

The glass laminates described in the following working examples are prepared by interposing either 15 mil or 30 mil interlayers between two 12 x 12 x 0.125 inch glass sheets. These glass sheets intended for use in the laminates are scrubbed using brushes and a mild detergent solution, rinsed under tap water at from 10 to 50° C., given a final rinse in distilled water and allowed to drain for one hour at room temperature. The resulting laminates are then subjected to a temperature of about 275° F. at a pressure of 185 p.s.i. for approximately 10 minutes to bond the laminate or panels together.

Unless otherwise indicated, the poly(vinyl butyral) interlayer used in these laminates is regular production material with the following characteristics:

| Thickness | PVOH content, percent | Residual acetate content, percent | Percent moisture | Titer,[1] ml. |
|---|---|---|---|---|
| 15 mils (0.015 inch) | 19.0 | 1.3 | 0.4 | 25 |
| 30 mils (0.030 inch) | 18.9 | 0.8 | 0.43 | 28 |

[1] Due to potassium acetate.

It should be noted that while these particular interlayers are used in a majority of the working examples in order to achieve a uniform control, those skilled in the art will recognize them as merely representative of the poly(vinyl butyral) sheet that can be used in the practice of this invention. As is obvious to those skilled in the art, there are many grades of poly(vinyl butyral) that can be used as interlayer material. These will be set forth in greater detail below.

The glass sheets used are standard polished plate glass which is well known and widely used in the automotive and aeronautical glass laminating industry. However, the present invention is not to be construed as being limited to this type glass as will be pointed out below.

The laminates prepared by the above procedure are then subjected to Mean Break Height tests according to the recently established tentative specifications set up by the Society of Automotive Engineers, the Subcommittee on Automotive Glazing and the results reported below.

In essence, the Mean Break Height test comprises placing the laminate in a horizontal position with a frame or edge support and while maintaining a constant laminate temperature, which is 70° F. in this series, allowing a 5 pound steel ball to drop from a designated height against approximately the middle of the laminate. This test is repeated at increasing ball-drop heights to determine the approximate height in feet at which 50% of the laminates tested will resist penetration. In other words, the Mean Break Height of a laminate is a measure of the ability of that laminate to absorb the energy of an impacting object. In the present invention an increase in the Mean Break Height is considered to be an increase in the impact strength of the laminate.

The following examples are given in illustration of the invention and are not intended as limitations thereof. All parts and percentages are by weight unless otherwise specified.

The following Examples 1–6 are set forth in Table I to illustrate one aspect of this invention wherein the glass members of the laminates are treated with a material which improves the impact strength of the laminate.

The glass laminates are prepared according to the procedures set forth above except that the final rinse water used on the glass sheets contains additives which have been found to cause an increase in the impact strength of the resulting laminates. Thus, in the final rinse step the additives used to increase impact strength are introduced onto the surface of the glass sheet which surface is then laminated to the poly(vinyl butyral) interlayer.

TABLE I

| Example: | Rinse water additive | Amount, p.p.m.[1] | Mean Break Height (ft.) 70° F. interlayer thickness | |
|---|---|---|---|---|
| | | | 30 mil | 15 mil |
| 1 | Control | None | 8.0 | 2.4 |
| 2 | Na$_2$CO$_3$ | 50 | 13.5 | 3.7 |
| 3 | Na$_2$CO$_3$ | 110 | 17 | |
| 4 | MgCO$_3$ | 150 | 20.3 | 7.3 |
| 5 | CaCO$_3$ | 500 | 17.1 | |
| 6 | MgSO$_4$ | 150 | 14.6 | 3.5 |

[1] Amount of additive used to increase impact strength present in final rinse water calculated as parts per million (p.p.m.).

The data in the foregoing Table I illustrates the surprising increase in impact resistance that is obtained in the practice of this invention wherein an additive is added to the final rinse water in order to obtain an increase in the impact strength of the laminate. Note that the control, wherein the rinse water contains no additive, has the lowest Mean Break Height of those samples tested. On the other hand, the laminates prepared using the glass sheets that had been rinsed in water containing an increased impact strength additive undergo a significant increase in impact strength as indicated in the Mean Break Height. Note further that the realized improvement is obtained with both the 15 and the 30 mil interlayers.

EXAMPLE 7

Example 3 is repeated here except that potassium acetate is used in the final rinse water as the additive to increase impact strength. Comparable results are obtained.

EXAMPLE 8

Example 2 is repeated here except that zinc fluoride is used in the final rinse water as the additive used to increase impact strength. Comparable results are obtained.

Another aspect of this invention comprises spraying the additive used to increase impact strength onto at least one member of the laminate such that the additive is deposited at at least one of the glass/poly(vinyl butyral) glass interfaces of the resulting laminate. Conveniently, one would spray a solution or dispersion of the additives used to increase impact strength onto the glass and/or interlayer and allow the solvent or dispersing medium to evaporate leaving the additive deposited on the sprayed surface. This invention also contemplates using a spray of finely divided particles or droplets of the additives used to increase impact strength.

The following Examples 9–10 are set forth to illustrate the technique of spraying an increased impact strength additive onto the members to be laminated. In each example potassium acetate is used as the increased impact strength additive.

EXAMPLE 9

A 2.0% solution of potasium acetate in methanol is sprayed onto both sides of a 12 x 12 inch, 30 mil sheet of poly(vinyl butyral) using an air nozzle at 8 lbs. pressure. The methanol is allowed to evaporate and the sheet is conditioned to a moisture content of 0.4%. The amount of potassium acetate deposited on each surface is calculated to be about 270 mg./m.$^2$. The Mean Break Height of the laminates prepared from this sheet is 18 feet. This shows a significant improvement over the value of 8 feet obtained when using the 30 mil control sample of Example 1.

EXAMPLE 10

Example 9 is repeated here except that the potassium acetate solution which contains 0.5% potassium acetate in methanol, is sprayed onto the surface of the glass sheets that are to be in ultimate contact with the poly (vinyl butyral) interlayer. The amount of potassium acetate deposited on each surface is calculated to be about 200 mg./m.$^2$. The Mean Break Height of laminates prepared from this sheet is 16 feet. This shows a significant improvement over the value of 8 feet obtained when using the control sample of Example 1.

The following Examples 11–15 which are listed in Table II are set forth to illustrate various materials which have been sprayed onto the surfaces of the members of the laminate according to the procedure of Example 9 prior to the laminating step in order to achieve improved impact strength in the resulting laminate. In Examples 11 to 13 and 15 both surfaces of the interlayer are treated prior to lamination. In Example 14 both glass sheets are treated on that surface which comes into contact with the interlayer.

TABLE II

| Ex. | Surface treated | Additives used to increase impact strength | Amount,[1] mg./m.$^2$ | Mean break height interlayer thickness (feet), 30 mil |
|---|---|---|---|---|
| 11 | Interlayer | Zinc acetate | 20 | 12+ |
| 12 | do | Potassium succinate | 25 | 12+ |
| 13 | do | Potassium acetate/ potassium formate | 35 | 12+ |
| 14 | Glass | Sodium chloroacetate | 25 | 12+ |
| 15 | Interlayer | Potassium stearate | 35 | 12+ |

[1] Amount on each surface treated.

EXAMPLE 16

Example 9 is repeated here except that a solution of potassium stearate is used. The concentration of potassium stearate deposited on each surface is calculated to be about 10 mg./m.² Comparable results are obtained in the Mean Break Height tests.

The following Examples 17–18 are set forth to illustrate the treatment of only one surface of one member of the laminates prior to the lamination step with an additive which increases the impact strength of the laminate.

EXAMPLE 17

Example 9 is repeated here except that only one surface of the poly(vinyl butyral) sheet is treated. A 0.5% aqueous solution of potassium acetate is used and the amount of potassium acetate deposited on the sheet is calculated to be 130 mg./m.² The Mean Break Height test was conducted so that the falling ball first struck the laminate side having the treated surface at the interface. The test results, which are comparable to those obtained in Examples 11–15, indicate that an improvement in impact strength may be achieved by only treating one surface of the poly(vinyl butyral) sheet.

EXAMPLE 18

Example 10 is repeated except that only one glass sheet has a treated surface. The amount of potassium acetate deposited on this sheet is approximately 130 mg./m.² This treated surface is in contact with the poly(vinyl butyral) interlayer in the resulting laminate and the laminate is tested as in Example 17. The test results, which are comparable to those obtained in Examples 11–15, indicate that an improvement in impact strength may be achieved by only treating one surface of the glass.

Those skilled in the art will recognize that after either the glass or the interlayer is treated with the impact strength increasing agent, the laminate must be formed such that the treated surface is at the glass/poly(vinyl butyral) interface, i.e. that area where the surface of the poly(vinyl butyral) sheet is laminated to the surface of the glass. The amount deposited is conveniently measured by conventional methods such as weight gain, titer calculations, deposition rate tables, etc.

The polyvinyl acetal resins which are employed in the present invention may be made from various unsubstituted ketones containing an active carbonyl group or from mixtures of unsubstituted aldehydes and ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be utilized. In general, the acetal resin is made by reacting an aldehyde with hydrolyzed polyvinyl ester wherein the carboxylic moiety is derived from an aliphatic acid of from 1 to 8 carbon atoms such as formate, acetate, propionate, butyrate, 2-ethylhexanoate, dodecanoate, etc. in the presence of a solvent for the product and precipitating the resin product with water. Alternate methods might include carrying out the reaction in the presence of a non-solvent dispersing medium such as water or a non-solvent mixture of water and solvent, e.g., a water-ethanol mixture. More detailed methods for preparing such resins are set forth in Morrison et al. U.S. Pat. Re. 20,430, dated June 29, 1937, and Lavin et al. U.S. Pat. 2,496,480. In general, polyvinyl acetal resins made from saturated lower unsubstituted aliphatic aldehydes are the most suitable. These would include polyvinyl acetal resins made from unsubstituted saturated aliphatic aldehydes containing less than 6 carbon atoms such as propionaldehyde, valeraldehyde and especially those made from formaldehyde, acetaldehyde, butyraldehyde and mixtures thereof. Particularly preferred are polyvinyl acetal resins made from butyraldehyde.

In general, the polyvinyl acetal resins employed have Staudinger molecular weights ranging from about 50,000 to 600,000 and preferably from 150,00 to 270,000 and may be considered to be made up, on a weight basis, of from 5 to 25% hydroxyl groups, calculated as polyvinyl alcohol, 0 to 40% ester, and preferably acetate groups, calculated as polyvinyl ester, e.g., acetate, and the balance substantially acetal. When the acetal is butyraldehyde acetal, the polyvinyl acetal resin will preferably contain, on a weight basis, from 0.1 to 1.0% moisture, from 9 to 30% hydroxyl groups, calculated as polyvinyl alcohol and from 0 to 3% ester, e.g., acetate groups, calculated as polyvinyl ester, the balance being substantially butyraldehyde acetal.

The glass employed in the present invention may be regular plate glass, polished plate glass, or float glass, etc. of varying thickness. In addition, this invention also contemplates using fully or semi-heat tempered or chemically tempered glass of varying thickness. Some applications may require a clear, rigid or semi-rigid plastic coverplates such as poly (methyl methacrylate) instead of the traditional glass coverplate.

The additives used to increase glass laminate impact strength in the practice of this invention are well known to those skilled in the interlayer-safety-glass art. These additives are described in such patents as U.S. 2,496,480; 3,231,461; 3,249,488; 3,249,489; 3,249,490; 3,262,835; 3,262,836; 3,262,837; 3,271,233; 3,271,234 and 3,271,235. Examples of these materials which may be used in the practice of this invention to increase the impact strength of glass laminates include:

(A) alkali and alkaline earth metal salts and bases such as calcium carbonate, magnesium sulfate, sodium carbonate, potassium fluoride, sodium hydroxide, etc.

(B) metal salts of monocarboxylic organic acids containing from 1 to 22 carbon atoms such as potassium acetate, sodium formate, lithium propionate, magnesium butyrate, zinc stearate, sodium isobutyrate, cadmium acetate, cupric acetate, aluminum acetate, lead acetate, manganese acetate, etc.

(C) metal salts of dicarboxylic organic acids containing from 4 to 9 carbon atoms such as potassium succinate, potassium glutarate, sodium adipate, etc.

(D) fluoride salts such as the fluoride salts of alkali metals, calcium, antimony, beryllium, cadmium, germanium, silver, tin zinc, fluoro-silicates and fluoro-borates.

(E) organic acids such as monocarboxylic acids of from 6 to 22 carbon atoms, dicarboxylic acids of from 4–12 carbon atoms, aliphatic monoamino monocarboxylic acids of from 2 to 6 carbon atoms, aliphatic monoamino dicarboxylic acids of from 4 to 5 carbon atoms, citric acid and mixtures thereof.

(F) halogen, aryl, alkyl and amino derivatives of acetic and propionic acids and salts of these acids such as potassium chloroacetic acid, potassium phenoxyacetate, alanine, etc.

(G) alkali and alkaline metal salts of aromatic acids such as benzoic acid, phthalic acid, etc.

(H) mixtures of the foregoing.

The amount of impact strength increasing additive deposited at the interface or interfaces of the laminates in order to obtain an increase in impact strength will depend on the particular system used. In general, if too little increased impact strength additive is deposited at an interface there will be no significant increase in the impact strength of the resultant laminated safety-glass. On the other hand, no particular advantage can be obtained using an amount of increased impact strength additive in excess of that needed to obtain a desired level of impact strength.

In this regard, it is well known to those in the art that the amount of additive required to achieve a given impact strength as expressed in terms of Mean Break Height is a function of the particular additive used as well as the thickness of the interlayer. The general rule is that the thicker the interlayer in the range of 0.010 to 0.120 inch thickness, the greater is the impact strength obtained. In other words, the Mean Break Height values will be greater as the thickness of the interlayer is increased.

On the other hand, there is no set rule for the amount of additive to use to achieve a given Mean Break Height as the phenomena of increased impact strength will vary widely depending on the additive used. An illustration of the variation in the amount of additive needed to achieve a given Mean Break Height with a 30 mil interlayer treated on both sides is as follows: when the impact strength increasing additive used in potassium acetate, from about 50 to about 400 mg./m.$^2$ are required, to produce a Mean Break Height of from 13 to 21 feet while a 1:1 by weight mixture of potassium acetate and potassium succinate will give a Mean Break Height of from 13 to 21 feet at a deposition rate of about 25 to about 200 mg./m.$^2$. Thus, the amount of the potassium acetate/potassium succinate mixture required to give the same impact strength is considerably lower than when using straight potassium acetate. Other additives such as stearate salts will only require amounts as low as 5 mg./m.$^2$ on only one surface to achieve an improvement of either the glass or the interlayer in the Mean Break Height.

In general, at least 5 mg./m.$^2$ and preferably 20 mg./m.$^2$ of the additive used to increase impact strength should be deposited uniformly at at least one of the glass/poly(vinyl butyral) interfaces in order to achieve an increase in impact strength in the laminate. The upper limit on the amount deposited is determined by the additive used as well as the thickness of the interlayer, and the degree of impact strength desired. Stated in another way, the maximum amount used is selected to maximize the impact strength of the laminate without adversely affecting other properties such as light transmission and laminate configuration.

In general, one uniformly deposits at at least one glass/poly(vinyl butyral) interface in the resulting laminate sufficient increased impact strength additive to obtain a Mean Break Height of at least 3 to 10 feet using a 10 to 30 mil interlayer, respectively; and at least 24 feet when using interlayers having a thickness of greater than 45 mil according to the tests described above.

The process set forth in this invention contemplates depositing a uniform amount of an additive which will increase impact on at least one surface of either the glass sheets or the interlayer used to prepare the laminate such that the additive is deposited at at least one of the glass/interlayer interfaces in the resulting laminate. This material is conveniently deposited thereupon by bringing at least one surface of at least one of the members to be laminated in contact with a solution or dispersion containing the additive used to increase impact strength wherein the additive is deposited on the surface of the member to be laminated upon evaporation of the solvent or the dispersing medium. Alternately, one may treat at least one surface of at least one of the members to be laminated by spraying a solution or dispersion of the additive used to increase impact strength onto the surface. This invention also contemplates treating at least one surface of the members of the laminate with fine particles or droplets of the additive itself without the use of solvent or dispersing mediums. This may be carried out using atomizers, pressure spray equipment, dust chambers, etc. When using this aspect of the invention, care must be taken to achieve ultrafine particles or droplets and to have these particles or droplets evenly distributed over the surface to be treated.

Preferably, one would use solutions or dispersions of increased impact strength additives to treat the members to be laminated.

The solvent or dispersing medium may be water; alcohols, such as methanol, ethanol, etc.; ketones such as acetone, methyl ethyl ketone, etc.; esters such as methyl acetate, ethyl acetate, etc. The particular solvent or dispersing medium used will depend on the solubility of the increased impact strength additive used as well as the technique or method of applying this material to the surface of the member of the laminate. In general, the solvent or dispersing medium should not adversely affect the glass or interlayer material and it should be easily removed by evaporation techniques.

EXAMPLE 19

This example illustrates some of the variations in poly(vinyl butyral) interlayer material that can be used in the practice of the present invention in the preparation of laminates with improved impact strength. In each instance the general procedure of Example 9 is followed except using a 30 mil interlayer with characteristics as set forth below in order to prepare the laminates.

| Sample: | Percent PVOH content [1] | Percent residual acetate control | Percent moisture | Titer,[2] ml. |
|---|---|---|---|---|
| A | 22 | 2.5 | 0.2 | 0 |
| B | 16.2 | 1.7 | 0.8 | 37 |
| C | 19.1 | 1.1 | 0.73 | 40 |
| D | 17.3 | 0.9 | 0.52 | 18 |

[1] Percent PVOH—hydroxyl groups in the resin calculated as polyvinyl alcohol.
[2] Titer—Sample A prepared from resin washed free of titer. Titer in other samples due to potassium acetate resin. Titer measured as described in U.S. Pat. 3,262,835.

The impact strength of the resulting laminates is found to be equivalent to that obtained with the laminates of Example 9.

This invention also contemplates the treatment of only one side of the glass sheet or of the interlayer or particular spots or areas on either the glass or the interlayer material. This can be accomplished by various means such as bringing only one surface of the glass or the interlayer in contact with the additive used to increase impact strength or by protecting or covering the areas which are not to be treated. In this regard, this invention also contemplates the preferential edge treatment with materials which would improve adhesion thereby minimizing the danger of edge delamination. Materials which are known to improve adhesion in the poly(vinyl butyral) interlayer glass laminates are generally known to those skilled in the art. These materials include inorganic acids, such as hydrochloric acid, orthosilicic acid, etc. Further teaching of additives to increase edge adhesion may be found in U.S. Pat. 3,202,568.

Safety-glass laminates find special application in the automotive and aircraft industries for protection of passengers, both against the hazards of flying objects and to reduce injury caused by body impact against the laminate. Wherever else glass or transparent panels are utilized, such as in the building trade, the protection afforded by safety-glass has become increasingly important. The laminates of the present invention increase the advantage utilizing safety-glass because they are improved safety performance.

It is obvious that many variations may be made in the products and processes set forth above without departing from the spirit and scope of this invention.

What is claimed is:
(1) treating the surface of one of the members to be laminated with an aqueous solution of an additive;
(2) removing the water from the aqueous solution leaving the additive deposited on the treated surface; and then
(3) laminating the poly(vinyl acetal) interlayer to the glass sheets such that the treated surface is at a glass/poly(vinyl acetal) interface;
wherein the amount of the additive deposited is at least 5 mg./m.$^2$; and wherein the additive is selected from the group consisting of: alkali and alkaline earth metal salts and bases; metal salts of monocarboxylic organic acids containing from 1 to 22 carbon atoms; metal salts of dicarboxylic organic acids containing from 4 to 9 carbon atoms; fluoride salts; halogen, aryl, alkyl, and amino derivatives of acetic and propionic acids and salts of these acids; alkali and alkaline metal salts of aromatic acids; and mixtures of the foregoing.

2. The process of claim 1 wherein at least one surface of at least one member to be laminated is brought into contact with a solution of the additive.

3. The process of claim 1 wherein a solution of an additive is sprayed onto the surface of at least one member of the laminate.

4. The process of claim 1 wherein a dispersion of an additive is sprayed onto the surface of at least one member of the laminate.

5. The process of claim 1 wherein both sides of the interlayer are treated with an additive.

6. The process of claim 1 wherein both glass surfaces that are in ultimate contact with the poly(vinyl acetal) layer are treated with an additive.

7. A process for the preparation of a poly(vinyl acetal) interlayer glass laminate wherein the process comprises:
   (1) treating one surface of the glass member to be laminated with an aqueous solution of an additive;
   (2) removing the water from the aqueous solution leaving the additive deposited on the treated surface; and then
   (3) laminating the poly(vinyl acetal) interlayer to the glass sheets such that the treated glass surface is at a glass/poly(vinyl acetal) interface;
wherein the amount of the additive deposited is at least 5 mg./m.$^2$; and wherein the additive is selected from the group consisting of: alkali and alkaline earth metal salts and bases; metal salts of monocarboxylic organic acids containing from 1 to 22 carbon atoms; metal salts of dicarboxylic organic acids containing from 4 to 9 carbon atoms; fluoride salts; halogen, aryl, alkyl, and amino derivatives of acetic and propionic acids and salts of these acids; alkali and alkaline metal salts of aromatic acids; and mixtures of the foregoing.

8. A process for increasing the impact strength of poly(vinyl butyral) interlayer glass laminates, wherein the process comprises:
   (1) treating a surface of a glass member to be laminated with an aqueous solution of an additive;
   (2) removing the water from the aqueous solution leaving the additive deposited on the treated surface; and then
   (3) laminating the poly(vinyl butyral) interlayer to the glass sheets such that the treated glass surface is at a glass/poly(vinyl butyral) interface;
wherein the amount of the additive deposited is at least 5 mg./m.$^2$; and wherein the additive is selected from the group consisting of: alkali and alkaline earth metal salts and bases; metal salts of monocarboxylic organic acids containing from 1 to 22 carbon atoms; metal salts of dicarboxylic organic acids containing from 4 to 9 carbon atoms; fluoride salts, halogen, aryl, alkyl, and amino derivatives of acetic and propionic acids and salts of these acids; alkali and alkaline metal salts of aromatic acids; and mixtures of the foregoing.

9. The process of claim 8 wherein at least one surface of the glass member to be laminated is brought into contact with a solution of the additive.

10. The process of claim 8 wherein a solution of an additive is sprayed onto a surface of the glass member to be laminated.

11. The process of claim 8 wherein a dispersion of an additive is sprayed onto the surface of the glass member to be laminated.

12. The process of claim 8 wherein the additive in the solution is selected from the group consisting of potassium acetate; sodium carbonate; magnesium carbonate; calcium carbonate; and magnesium sulfate.

13. A process for increasing the impact strength of poly(vinyl butyral) interlayer glass laminates, wherein the process comprises (1) treating a surface of a glass member to be laminated with an aqueous solution of an additive selected from the class consisting of potassium acetate, sodium carbonate, magnesium carbonate, calcium carbonate, and magnesium sulfate; (2) removing the water from the surface of the glass leaving deposited thereon at least 5 mg./m.$^2$ of the additive; and (3) laminating the poly(vinyl butyral) interlayer to the glass sheet such that the surface of the glass having the additive deposited thereon is in laminated contact with the polyvinyl butyral sheet.

References Cited

UNITED STATES PATENTS

| | | | |
|---|---|---|---|
| 3,231,461 | 1/1966 | Mattimoe | 161—199 |
| 3,262,835 | 7/1966 | Lavin et al. | 161—199 |
| 3,262,836 | 7/1966 | Lavin et al. | 161—199 |
| 3,282,722 | 11/1966 | Hailstone | 161—199X |
| 3,372,074 | 3/1968 | Rocher | 161—199X |
| 3,389,047 | 6/1968 | Lavin et al. | 161—199 |
| 3,396,075 | 8/1968 | Morris | 161—199 |
| 3,437,553 | 4/1969 | Hailstone | 161—199 |

JOHN T. GOOLKSIAN, Primary Examiner

D. J. FRITSCH, Assistant Examiner

U.S. Cl. X.R.

156—308, 309, 313; 161—125, 199

PO-1050
(5/69)

UNITED STATES PATENT OFFICE
CERTIFICATE OF CORRECTION

Patent No. 3,556,890      Dated January 19, 1971

Inventor(s) Francis T. Buckley, Raymond F. Riek, Donald I. Christe

It is certified that error appears in the above-identified patent and that said Letters Patent are hereby corrected as shown below:

Column 2, line 2, "in" should read --- to ---.

Column 8, after "What is claimed is:" (line 59), insert --- 1. A process for increasing the impact strength of poly(vinyl acetal) interla glass laminates, wherein the process comprises: ---

Signed and sealed this 25th day of May 1971.

(SEAL)
Attest:

EDWARD M. FLETCHER, JR.
Attesting Officer

WILLIAM E. SCHUYLER,
Commissioner of Paten